United States Patent [19]
Russell

[11] 3,755,682
[45] Aug. 28, 1973

[54] MACHINE POSITION DETECTION AND CONTROL DEVICES

[75] Inventor: Alexander Russell, Glasgow, Scotland

[73] Assignee: National Research Development Corporation, London, England

[22] Filed: July 1, 1971

[21] Appl. No.: 158,890

[30] Foreign Application Priority Data
July 1, 1970 Great Britain................... 31,794/70

[52] U.S. Cl........... 250/231 R, 250/237 G, 250/209
[51] Int. Cl. ............................................. G01d 5/34
[58] Field of Search ............ 250/231, 231 P, 237 G, 250/208, 209; 356/167, 170

[56] References Cited
UNITED STATES PATENTS
| | | | |
|---|---|---|---|
| 2,886,718 | 5/1959 | Shepherd et al. .............. | 250/220 M |
| 3,529,170 | 9/1970 | Russell................................ | 356/167 |
| 3,500,055 | 3/1970 | Russell et al..................... | 356/167 X |
| 3,070,700 | 12/1962 | Budnick............................ | 250/237 G |
| 3,154,688 | 10/1964 | Shepherd........................ | 250/237 G |

Primary Examiner—Walter Stolwein
Attorney—Cushman, Darby & Cushman

[57] ABSTRACT

In a position indicating or measuring device, diffraction gratings are attached to relatively movable members and light fringes formed by the gratings are directed onto an array of at least eight photoelectric cells, such as an integrated circuit photocell array transducer, the outputs of the photocells being selected in cyclic order by scan pulses to produce a composite output signal having a cyclic waveform the timing of which is compared with a reference signal.

In a position control device, data pulses, e.g. from a punched tape, may then be added to or subtracted from the scan pulses to alter the timing of the composite output signal with respect to the reference signal. The resulting error signal may be applied to a servomechanical system which can move a desired one of the movable members to a required position in accordance with the data pulses. The movable member may follow a predecided contour or move from point to point.

13 Claims, 9 Drawing Figures

MACHINE POSITION DETECTION AND CONTROL DEVICES

This invention relates to position indicating or measuring devices suitable for use in control devices for precision machines or apparatus such as machine tools.

It is well known to utilise light fringes such as Moire fringes produced by two optical gratings arranged with an angle between the grating lines and attached to a fixed and a moving member of, for example, a machine tool, as part of a position measuring system. Higher resolution systems are also known in which a fringe is observed at four points followed by treatment to give a sine-wave for comparison with a master sinewave, but such a method requires use of a narrow band pass filter to remove harmonics from the sinewave and this limits the speed of movement of the system while the timing of the sinewave is affected by the relative timing of the observation points.

I have found that by scanning the fringe pattern at at least eight points by means of a compact linear photocell array, so that there are at least two scan points per quarter cycle, a composite output waveform can be simply derived which is a markedly more accurate indication of the position of the fringe pattern and is substantially unaffected by the timing of the scanning points relative to the fringe pattern.

In its broadest aspect, the invention provides an accurate yet simple position indicating or detecting device which can readily be utilised in a position detection and control device capable of positioning a member such as a machine part of a much higher speed than previously possible.

According to the invention, apparatus for indicating or measuring the relative position of two relatively movable members and comprising a first optical grating on one member, and a second optical grating on the other member arranged to co-act with the first optical grating to produce a fringe pattern when illuminated by a light source, the relative movement of the gratings causing apparent movement of the fringe pattern, a linear array of at least eight photocells which are arranged to be illuminated by the fringe pattern so that each individual photocell is illuminated by a different part of the fringe pattern, means for selecting sequentially in cyclic order the outputs of the photocells to provide a composite output having a cyclic waveform, there being sufficient photocells in the array to ensure that the shape of the cyclic waveform of their composite output is substantially unaffected by any change in position of the fringe pattern, and means for comparing the timing of the waveform of the composite output with the timing of a reference signal to indicate the relative position of the two members. Preferably the linear array of photocells is an integrated circuit photo-electric cell array transducer and preferably there are at least 20 cells in the array.

Apparatus according to the invention may comprise a clock pulse generator, means for deriving the reference signal from the clock pulse generator, and means for deriving from the clock pulse generator scan pulses which are used to select the outputs of the photocells in cyclic order, the frequency of the scan pulses being $n$ times that of the reference signal where there are $n$ photocells in the array.

Optionally, said means for selecting sequentially in cyclic order the outputs of the photocells has a smoothing circuit to which the outputs are fed and which smoothes out signal components having a frequency around that of the scan pulses to produce a smoothed output having a waveform substantially in accordance with that of the fringe pattern.

Preferably apparatus according to the invention may comprise means for generating a predetermined sequence of data pulses which may be used to control the position of one member relative to the other member and means for adding data pulses to or subtracting data pulses from the sequence of scan pulses selecting the outputs of the photocells, thereby changing the timing of the waveform of the composite output of the photocells. Optionally the apparatus may have servo-mechanical means to which the output of the position indicating means is applied, said servo-mechanical means causing the two relatively movable members to move progressively towards a relative position as required by the data pulses.

Optionally said linear array is an integrated circuit photo-cell array transducer, such as an "Optosyn" transducer, comprising a chip of silicon having, for example, 50 photocells at a spacing of 0.004 inch, the length being 0.2 inch and the apparatus optionally being arranged so that one light fringe is equal in length to the array and is focused to cover the width of the array.

The clock pulses may be generated by conventional means such as a crystal oscillator and a suitable frequency for the clock pulses is $2 \times 10^6$ Hz. The clock pulses may be frequency divided to give scan pulses to scan the output of the photocells, to give synchronisation pulses to control the scan pulses and to give a reference signal to be compared in timing with the timing of the composite output from the photocells for example by comparing their phases by means of a phase comparator, such as a flip-flop type comparator which is arranged so as to produce substantially zero volts output at a phase difference of 180°; a 180° reference signal will then be required.

The data pulses may be generated by conventional means such as a read-out from a punched tape or magnetic tape and may be connected to interpolation means to plan, for example, the $x$ and $y$ increments required to follow a predecided contour. Each data pulse may conveniently correspond to a relative movement between the fixed and movable members of 0.0001 inch.

Suppose for example that the data pulse is similar in form to the clock pulses. Then addition or subtraction of a data pulse into the variable frequency division means which converts the clock pulses to synchronisation pulses will advance or retard the phase of the synchronisation pulse compared with the phase of the reference signal causing a phase difference to be registered by the phase comparator which actuates the servo means which causes relative movement of the movable members in a direction tending to reduce the phase difference. The rate of relative movement is determined by the rate of input of the data pulses. Preferably means are provided to detect the timing difference between the waveform of the composite output of the photocells and the timing of the reference signal and which can limit the rate of addition or subtraction of data pulses so that it cannot exceed a predecided value.

Preferably, the data pulse is fed into the variable frequency division means through means to prevent coincidence of a scan pulse and a positive data pulse and to withhold a scan pulse when a negative data pulse is introduced.

By disconnecting the servo mechanism and introducing data pulses into a system controlling one axis of movement of a movable member relative to a fixed member, the phase of the signal controlling that axis can be altered without movement of the member. This facility is known as off-set and is convenient when a heavy work piece must be initially accurately positioned on a machine tool, since the zero datum can be altered to coincide with the actual position of the workpiece.

Preferably means are also provided which can give a read-out of the relative positions of the movable members and this may be a counter and an accumulator.

The apparatus may be used to programme a machine tool so that a movable part of said machine tool can follow a predecided contour on a fixed workpiece. Alternatively a machine tool may be operated so that a part of said machine tool is moved from a first predecided position to a second predecided position with respect to a fixed part of said machine tool when the position of the movable member of the machine tool may conveniently be detected by e.g. three detection and control systems, coarse, intermediate and fine, each dependent on the stroke of an associated transducer. The position of the movable member is then altered until it is within the limits of the position defined by the coarse system, when the intermediate system takes control and then the fine system. The fine transducer is preferably of the optical grating type described above but the coarse and intermediate transducers are preferably synchro-resolvers.

The phase of each transducer may be compared with a required phase by means of a phase comparator of conventional kind, the output of the phase comparator being used to drive a closed-circuit servo system as before.

Preferably the input data is held in a binary store, the data being in three parts, each part corresponding to one transducer, the three parts overlapping to minimise the chance of error. Each store may be connected to an 'and' gate, a second side of which is connected to a binary scaler connected to a source of pulses. The binary scaler may be arranged to supply the scan and synchronisation pulses to the optical transducer and suitable signals to the synchros, so that when coincidence is reached at the 'and' gate, a pulse is sent to the phase comparator.

The input data may be for example in punched tape form and the binary store may be capable of metric conversion if required and allow a datum shift; e.g. the binary store may contain a positive number between $2^0$ and $2^{18}-1$ in value; then, for example, if the input data is ranged between $-2^9$ and $+2^9$, means may be provided to add $+2^9$ to the input data values, this datum shift bringing the input data values into the correct range. The binary store may also provide a facility for off-set as hereinbefore described.

For a rotary device such as a synchro, the feedback signal would be $\sin(wt + \theta)$ where $\sin wt$ is the "carrier" frequency and $\theta$ is the transducer angle. For a linear transducer such as an optical grating providing a time-phase signal the phase angle of which is proportional to position, the equivalent signal is $\sin(wt + 2\pi d/p)$ where '$d$' is the distance travelled within a cycle and '$p$' is the pitch of the grating.

The input data store may have output gates from $2^0$ to $2^{18}$, with the coarse transducer controlled by $2^{11}$ to $2^{18}$, the intermediate transducer by $2^5$ to $2^{12}$, and the fine transducer by $2^0$ to $2^6$. A suitable frequency for the supply to the binary scaler is 2 MHz and the binary scaler may divide the crystal frequency by 256. The square wave at the $2^7$ output of the binary scaler is at a suitable frequency for $\sin wt$ and the square wave from the $2^2$ output is suitable for scan pulses. The scan: synchronisation frequency ratio is then 32:1 so that the complete light pattern must be focused onto a 32 photocell device or a 50:32 ratio device for use in conjunction with a 50 photocell array. By combining the $2^7$ and $2^6$ outputs at an 'equivalent' gate a suitable cosine signal is available for synchro operation, while the $2^7$ output provides a sine signal.

If the coarse synchro — which is conveniently driven from a leadscrew in a machine tool — has a stroke of 52.4 inches, and the intermediate synchro has a stroke of 0.8192 inch, the system will provide control over a stroke of 52 inches with a resolution of 0.0001 inch.

The gratings attached to the fixed and movable members may be of identical pitch and may be relatively tilted so as to form Moire fringes. Alternatively the gratings may be of pitches which differ slightly, for example by ±1 line pair over a distance equal to the length of the photocell array, and may be parallel so that Vernier fringes are formed.

Two specific embodiments of the invention will now be described by way of example only with reference to the accompanying drawings in which.

Figure 1:
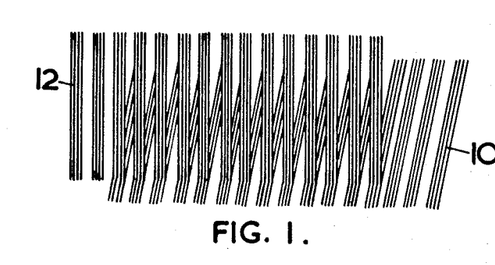
FIG. 1 illustrates the relative arrangement of two transmission optical gratings.

Referring to FIG. 1, a first optical grating 10 of pitch 0.01 inch is attached to a fixed member of a machine tool (not shown) and a second optical grating 12 also of pitch 0.01 inch is attached to a moving member of a machine tool (not shown) the planes of the gratings being parallel but there being a small angle between the two sets of grating lines so that relative lateral movement between the gratings causes Moire fringes to be produced.

Figure 2:
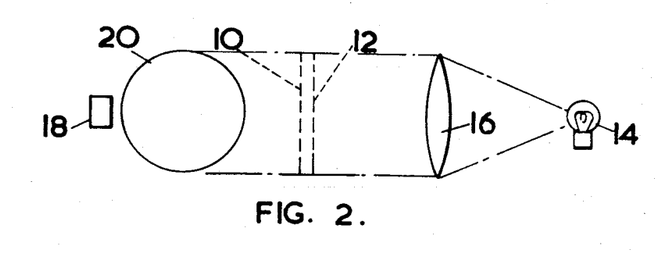
FIG. 2 illustrates diagrammatically the arrangement of the optical system.

In FIG. 2 gratings 10, 12, are illuminated with parallel light from a lamp 14 situated at the focus of a collimator lens 16 and the Moire fringes are detected by an integrated photocell array 18 through a cylindrical lens 20, lens 20 allowing array 18 to detect the average effect of a number of grating lines and concentrating the light over the width of the array. The angle between the lines of gratings 10 and 12 must be adjusted to that one cycle of fringe pattern is equal to the length of the array 18.

Figure 3:
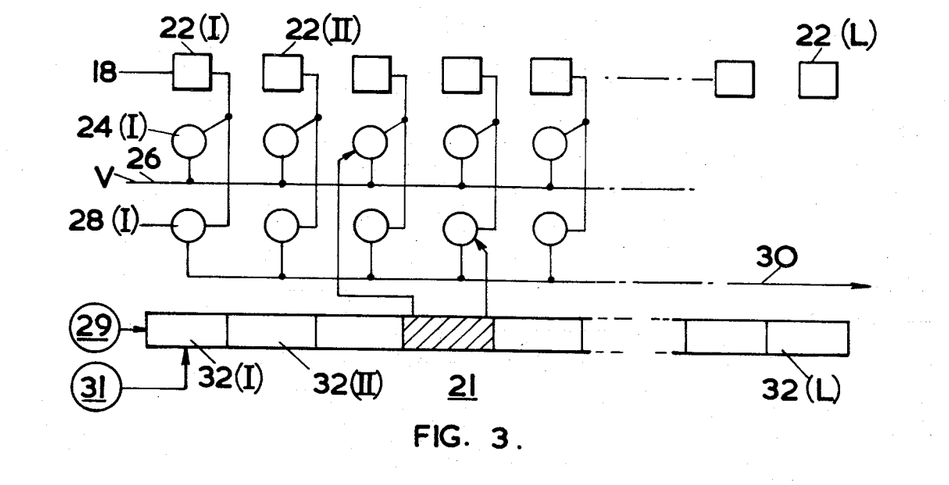
FIG. 3 illustrates diagrammatically an integrated circuit transducer incorporating the arrangements of FIGS. 1 and 2.

In FIG. 3 the integrated photocell array is indicated generally by reference 21 and contains 50 photocells 22(I) to 22(L) of the array 18 each connected to one of 50 charge gates 24(I) to 24(L) which are connected to a conductor 26 and each charge gate 24 is connected to one of fifty discharge gates 28(I) to 28(L) which in turn are connected to a video output line 30. A fifty-stage shift register 32 is provided, that is, the same number of stages are there are photocells. In operation a synchronisation pulse 29 is fed from an external source to stage I of the shift register, the "bit" causing photocell 22(L) to be charged to voltage V from conductor 26 and causing cell 22(I) to discharge its remanent voltage into video output line 30. A scan pulse 31, derived from the same external source as the synchronisation pulse, causes the "bit" to move along the shift register so that photocell 22(I) is charged to voltage V and photocell 22(II) discharges its remanent voltage into video output line 30, the more light which has fallen on the photocell, the lower the remanent voltage. The "bit" is shifted to each photocell in turn and is shown in photocell 22(III). As it leaves Stage 50 of shift register 32, a second synchronisation pulse is fed into Stage 1. Since a time corresponding to 49 scan pulses occurs between charging and discharging a particular pnotocell 22, an integration technique may be used when the array is manufactured to obtain increased sensitivity, and give an output of several volts.

Figure 4:
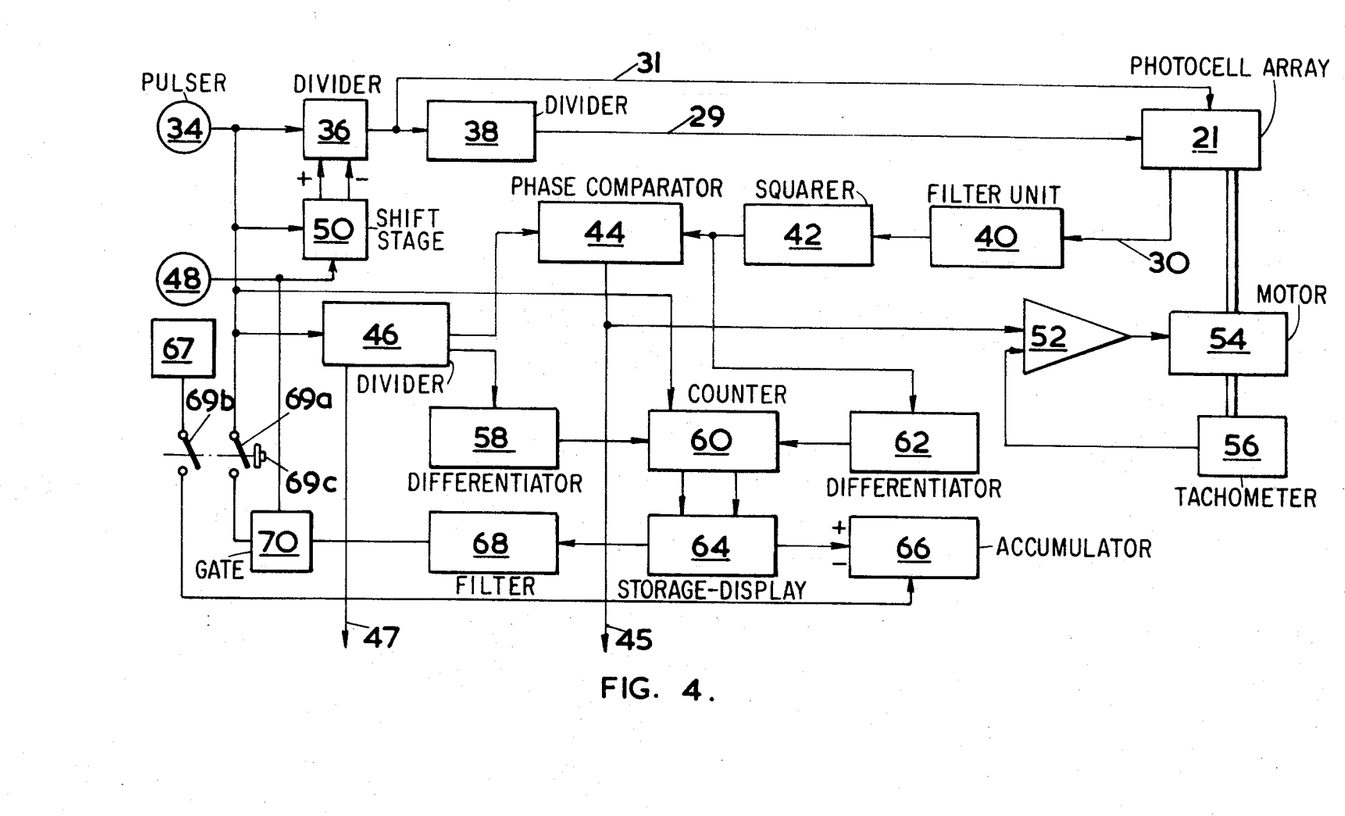
FIG. 4 is a block schematic diagram of an incremental data control and read-out system using an integrated circuit transducer and a d c servo system.

In FIG. 4, a source 34 of clock pulses is connected to a variable frequency divider 36 which is connected to the array 21 directly, and also indirectly through a fixed frequency divider 38.

The array 21 is connected through video line 30 to an electronic filter unit 40 and a squarer 42 to one side of a 180° phase comparator 44. A second side of the phase comparator 44 is connected to source 34 of clock pulses through a divider-frequency-by-one-hundred and squarer unit 46. The 180° signal from divider 46 is used. In operation, the clock pulse from source 34 is divided by two in variable frequency divider 36 and fed to the shift register 32 (FIG. 3) of array 21 as a scan pulse. The divided signal is further divided by 50 in frequency divider 38 and fed to the shift register 32 of array 21 as a synchronisation pulse. The signal from source 34 after division by 100 at divider 46 is fed to phase comparator 44 and is compared in phase with the cyclic phase signal from video line 30 of array 21 after the output has been filtered and squared, i.e. two square waves are compared as to phase. Any difference in phase causes an error signal to be generated in comparator 44. The combined frequency division produced by variable dividers 36 and 38 is equal to the frequency division produced by fixed divider 46.

Data pulses from an external source such as a punched tape reader and interpolator (not shown) are fed into the system at input 48 which is connected to a shift unit 50 which is connected to divider 36. Shift unit 50 is connected to source 34 in such a way that shift unit 50 'reads' the clock pulses and prevents coincidence of a data pulse with a clock pulse. Shift unit 50 is arranged so that arrival of a data pulse at unit 50 may cause an extra pulse to be added into divider 36, corresponding to an advance in time of the synchronisation and scan pulses fed into shift register 32. This causes an error of 1 percent at the phase comparator 44. Alternatively, arrival of a data pulse at unit 50 may withhold a pulse from divider 36, corresponding to a retardation in time of the clock pulse fed into shift register 32, and causing an error of 1 percent at the phase comparator 44 of opposite sign to the previously described error. The ratio of synchronisation to scan pulses remains at 1:50. Alternatively the divider 46 could be made variable thus altering the reference frequency.

Phase comparator 44 is connected to an amplifier 52 which is connected to a motor 54. Motor 54 is mechanically connected to the movable member of the machine tool, which carries the grating 12 and to a tachometer 56 which is electrically connected to amplifier 52. An error signal from comparator 44 through amplifier 52 causes motor 54 to drive the movable member in a direction tending to reduce the error signal, the tachometer detecting the velocity of movement and providing negative feedback to prevent overshoot.

The divider and squarer 46 may be used to supply more than one axis as indicated by reference 47, but the arrangement according to the invention allows the phase corresponding to each axis to be altered independently.

The 0° phase side of divider 46 is connected to a differentiator 58 which is connected to counter 60. Source 34 is also connected to counter 60, and the output of squarer 42, i.e. the squared video signal, is connected through differentiator 62 to counter 60. The counter 60 is connected to store and display unit 64 which feeds accumulator 66. In operation the pulse from divider 46 is differentiated by differentiator 58 and starts the counter 60, which counts the clock frequency from source 34 until the squared video signal from 42, after differentiation by differentiator 62, cuases the counter 60 to stop. The count is stored and displayed in unit 64, and is updated with each signal from the video line 30. Since the signals from source 34 and from the video line 30 are digitally related through divider 46 and variable dividers 36 and 38, an accurate measure of phase is made. Each cycle of phase is accumulated in accumulator 66 so that complete position information is available.

Store unit 64 is connected to a zero detector and filter 68 of the integrator type which is connected to an "inhibit" gate 70 through which connection is made via switch 69a to source 34 of clock pulses. "Inhibit" gate 70 is also connected to shift unit 50. Accumulator 66 is connected through a switch 69b to a voltage source 67 and switches 69a and b are mechanically connected to a push button 69c.

When a datum position is to be set up the servo motor 54 is switched off and the push button operated to close switch 69. Clock pulses from source 34 are fed into shift unit 50 until a digital zero is reached in store 64, indicating phase agreement, and a zero occurs in zero detector 68, which actuates "inhibit" gate 70 to open switches 69a, b. Closure of switch 69b acts to reset accumulator 66 by means of connection to source 67. Such an arrangement also provides facility for offset.

If no digital readout facility is provided to indicate phase agreement by means of a zero, the error signal from phase comparator 44 may be used directly in its analogue form. It may be arranged that when the error signal is zero, the servomechanism will not move.

In addition, said error signal from phase comparator 44 may be connected as indicated by reference 45 to means to reduce the rate of input of data pulses if there is excessive phase difference in the phase comparator 44, For example, if the slope of the signal at 45 is greater than a predecided slope, said reducing means may be caused to operate. The slope of the error signal is usually of the order of mV/thou.

Figure 5:
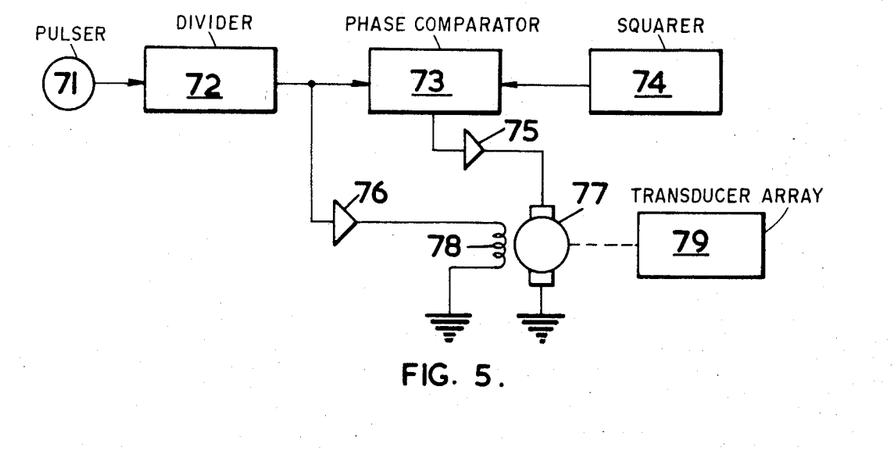
FIG. 5 is a partial block schematic diagram illustrating use of an a c servo system.

If it is required to use an A C servo motor the circuit modification shown in FIG. 5 may be employed. A source 71 of clock pulses is connected to a divide-frequency-by-100 and squarer unit 72 the 180° output of which is connected to one input of phase comparator 73. A second input of phase comparator 73 is connected to squarer 74 corresponding to squarer 42 in FIG. 4. Comparator 73 is connected to a first amplifier 75 which is connected to A C motor 77 which is mechanically connected to integrated circuit array transducer 79 corresponding to array 21 in FIG. 4. The output of unit 72 is also connected to a second amplifier 76 which is earthed through motor field coil 78. The rest of the apparatus is identical to that shown in FIG. 4.

In operation the phase of the first cyclic signal from squarer 74 is compared with the phase of the first cyclic signal from unit 72 by comparator 73. If the phases are not identical, a signal from comparator 73, amplified by amplifier 75, causes motor 77 to drive the movable member in a direction tending to reduce the error signal.

Figure 6:
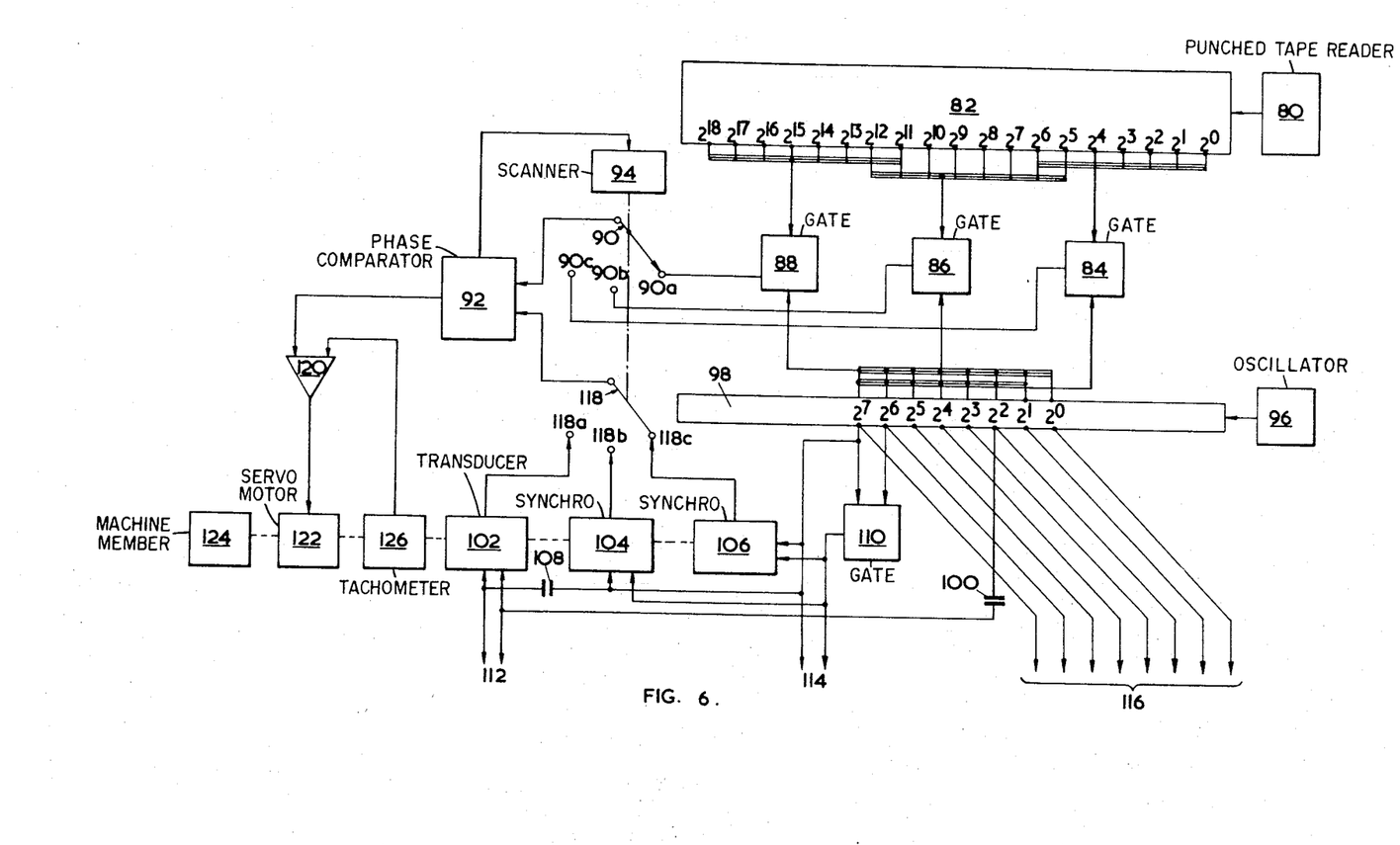
FIG. 6 is a block schematic diagram of a point to point control system using a d c servo system.

Another embodiment of the invention, in a point to point control system, is illustrated in FIG. 6.

Referring to FIG. 6, a punched-tape reader 80 is connected to input data store 82 having binary outputs from $2^0$ to $2^{18}$, of which outputs $2^0$ to $2^6$ are connected to diode "and" gate 84, outputs $2^5$ to $2^{12}$ are connected to diode "and" gate 86 and outputs $2^{11}$ to $2^{18}$ are connected to diode "and" gate 88. Gates 84, 86, 88 are connected to the three connections 90a, b, c of a three-position switch 90, the common terminal of the switch being connected to phase comparator 92. The arm of switch 90 is connected mechanically to a 3-step scanner 94 which is electrically connected to phase comparator 92.

A crystal controlled source of frequency 96 is connected to binary scaler 98, of which one side of the output is connected to gates 84, 86, 88, the other side providing the reference phase for the transducers. Output $2^2$ is connected through capacitor 100 to transducer 102. Output $2^7$ is connected directly to synchros 104 and 106 and through capacitor 108 to transducer 102. Outputs $2^7$ and $2^6$ are connected to "equivalent" gate 110 which is connected to synchros 104 and 106. If the crystal frequency is $2 \times 10^6$Hz, then output $2^2$ is at a frequency of $250 \times 10^3$Hz and provides scan pulses for optical transducer 102, of the kind illustrated in FIG. 3. Output $2^7$ will be at a frequency of $7.8125 \times 10^3$Hz, and provides synchronisation pulses for transducer 102. Optical transducers connected with other axes may also be supplied as indicated by reference 112. The frequency of $7.8125 \times 10^3$Hz also provides a sine input signal for synchros 104 and 106, and the combination of outputs $2^7$ and $2^6$ from gate 110 provides a cosine input signal to synchros 104 and 106. Sychros associated with other axes may be supplied as indicated by reference 114. Reference phases for other axes at different frequencies may be supplied as indicated by reference 116.

The output sides of optical transducer 102 and synchros 104 and 106 are connected to the three connections 118a, b, c of the three-position switch 118, the opposite side of switch 118 being connected to phase comparator 92, and the arm of switch 118 being mechanically connected to three-step scanner 94.

Phase comparator 92 is connected to amplifier 120 which feeds servo motor 122 which is mechanically connected to machine movable member 124, tachometer 126, transducer 102 and synchros 104 and 106. Tachometer 126 is electrically connected to amplifier 120 and provides negative feedback dependent on the velocity of the movable member.

In operation, data is fed to binary data store 82 from tape reader 80. The binary pattern in the "coarse" store between $2^{11}$ and $2^{18}$ is compared with the pattern in binary scaler 98 at the "and" gate 88. When coincidence is reached at gate 88, a data phase pulse is delivered through switch 90 to phase comparator 92. The position phase of synchro 106 is detected through switch 118 to phase comparator 92. If there is a phase difference, phase comparator 92 feeds an error signal to amplifier 120 which causes motor 122 to drive movable member 124, tachometer 126, transducer 102 and synchros 104 and 106 in a direction tending to reduce the error signal. If there is no phase difference, phase comparator 92 feeds a signal to three-step scanner 94 so that the arms of switches 90 and 118 are moved to positions 90b and 118b respectively. Then the number stored in intermediate outputs $2^5$ to $2^{12}$ of store 82 will form data phase pulses with the number in binary scaler 98 until no phase difference is detected in phase comparator 82 between the required position and the actual position of transducer 104, which causes scanner 94 to move the arms of switches 90 and 118 to 90c and 118c. Then the number stored in the fine outputs $2^0$ to $2^6$ will form data phase pulses and be compared with position phase pulses from 102.

Datum shift and offset facilities are provided in binary store 82.

It is an advantage of the system using synchronisation pulses that any error in the integrated circuit array is not cumulative since it is swept from the system by the next synchronisation pulse. It is a further advantage of an a c system according to the invention that there is no drift. By using a control system according to the invention on more than one axis, complex shapes may be machined.

Figures 7, 8:
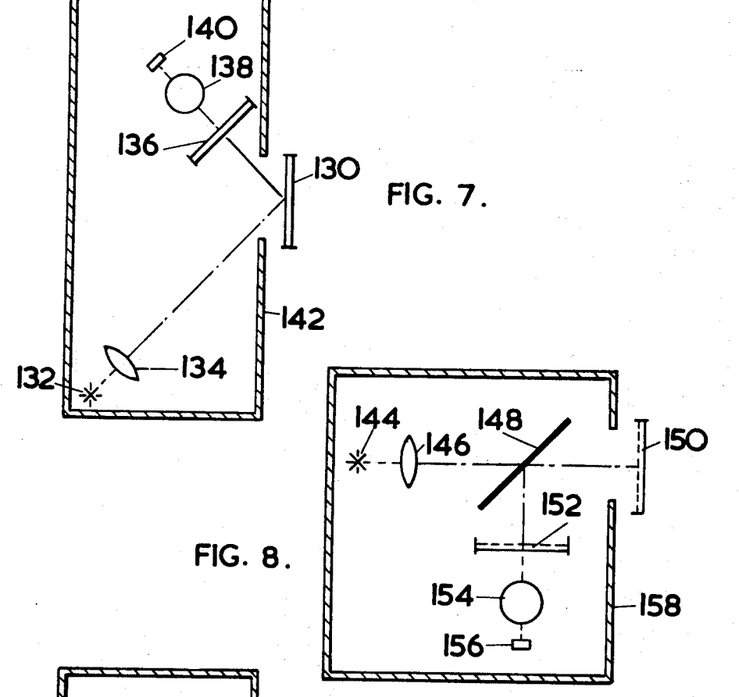
FIGS. 7, 8 and 9 illustrate schematically arrangements of two optical gratings and an integrated circuit transducer alternative to the arrangement in FIG. 2, light being reflected from one grating.

In FIG. 7 a grating 130 attached to a movable member (not shown) is illuminated by a lamp 132 and collimating lens 134. Light is reflected by the grating 130 towards an index grating 136, a cylindrical collecting lens 138 and an integrated circuit photocell array transducer 140. The index grating 136 is a Vernier grating of pitch equal to (pitch of grating 130 ± 1 line pair) over the length of the array 140. The optical system attached to the fixed member is enclosed in a protective enclosure 142.

In this arrangement the lines on the diffraction grating are parallel to the plane of the Figure i.e. ref 130 could be taken to represent one grating line, and grating 136 is parallel so that Vernier fringes are formed parallel to the grating lines. The array 140 is perpendicular to the plane of the Figure and the axis of the cylindrical collecting lens 138 is parallel to the array 140 so that the lens averages the grating lines rather than the grating length. It is an advantage that any movement of grating 130 at right angles to its plane will not cause error. However, as length averaging is absent, any abruptions in the grating 130 will cause error.

In FIG. 8 light from a lamp 144 passes through a collimating lens 146 and through a semisilvered mirror 148 to a grating 150 attached to a movable member (not shown). Light reflected by the grating is also reflected by the mirror 148 through an index grating 152 of pitch equal to that of grating 150 and a cylindrical collecting lens 154 to a photocell array 156. Ref 158 indicates a protective enclosure. In this arrangement the grating lines 150 and 152 are perpendicular to the plane of the Figure and are relatively tilted by a small angle and Moire fringes are produced at right angles to the lines on the diffraction gratings. The array 156 is parallel to the Moire fringes and the collecting lens 154 averages over the grating length so that the arrangement is tolerant to grating abruptions.

Figure 9:
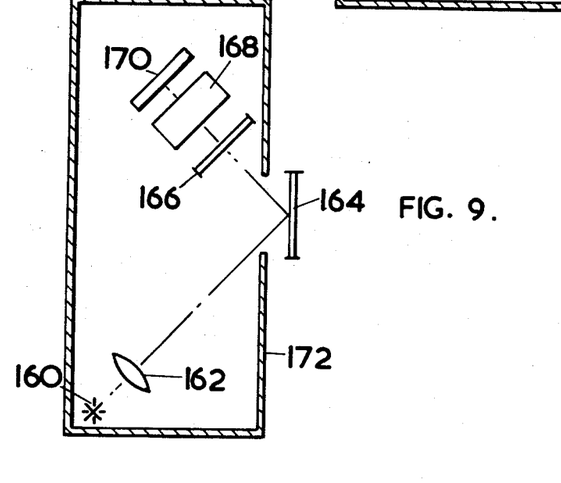

In FIG. 9 a lamp 160 illuminates a collimating lens 162 and a grating 164 attached to a movable member (not shown). Light reflected by the grating 164 passes through an index grating 166 and a cylindrical collecting lens 168 to a photocell array 170 shown in elevation in a protective enclosure 172. The arrangement is similar to that in FIG. 7 but the grating 164 and index grating 166 are of identical pitch and are relatively tilted to provide a Moire pattern at right angles to the grating lines. The collecting lens 168 and photocell array 170 have their axes at right angles to the grating lines so that the lens 168 averages over the grating length. Movement of the grating 164 in a direction perpendicular to its plane then causes insignificant errors.

In the arrangements of FIGS. 7, 8 and 9 it is preferable if the lamp filament is at right angles to the grating lines.

It is an advantage of apparatus incorporating reflective gratings such as those illustrated in FIGS. 7, 8 and 9 that all of the optical system except one grating, i e the light source, collimating lens, second grating, collecting lens and photocell array, can be sealed in a compact enclosure attached to the fixed member and that the single exposed grating, which is conveniently attached to a steel support, is easily fitted onto the moving member of the machine tool (or vice versa). With the transmission grating system of FIG. 2 the grating attached to the moving member must be positioned between the other items of the optical system which are attached to the fixed member in two separate positions, and this may cause design difficulties.

I claim:

1. Apparatus for indicating or measuring the relative position of two relatively movable members and comprising a first optical grating on one member and a second optical grating on the other member arranged to co-act with the first optical grating to produce a fringe pattern when illuminated by a light source, relative movement of the gratings causing apparent movement of the fringe pattern, a linear array of at least eight photocells which are arranged to be illuminated by the fringe pattern so that each individual photocell is illuminated by a different part of the fringe pattern, means for selecting sequentially in cyclic order the outputs of the photocells to provide a composite output having a cyclic waveform, there being sufficient photocells in the array to ensure that the shape of the cyclic waveform of their composite output is substantially unaffected by any change in position of the fringe pattern, and means for comparing the timing of the waveform of the composite output with the timing of a reference signal to indicate the relative position of the two members.

2. Apparatus according to claim 1 in which the linear array of photocells is an integrated circuit photoelectric cell array transducer.

3. Apparatus according to claim 1 and comprising a clock pulse generator, means for deriving the reference signal from the clock pulse generator, and means for deriving from the clock pulse generator scan pulses which are used to select the outputs of the photocells in cyclic order, the frequency of the scan pulses being $n$ times that of the reference signal, where there are $n$ photocells in the array.

4. Apparatus according to claim 3 and wherein the said means for selecting sequentially in cyclic order the outputs of the photocells has a smoothing circuit to which the outputs are fed and which smooths out signal components having a frequency around that of the scan pulses, to produce a smoothed output having a waveform substantially in accordance with that of the fringe pattern.

5. Apparatus according to claim 3 and having means for generating a predetermined sequence of data pulses which may be used to control the position of one member relative o the other member and means for adding data pulses to or for subtracting data pulses from the sequence of scan pulses selecting the outputs of the photocells; thereby changing the timing of the waveform of the composite output of the photocells.

6. Apparatus according to claim 5 and having servo-mechanical means to which the output of the position indicating means are applied, said servo-mechanical means causing the two relatively movable members to move progressively towards a relative position as required by the data pulses.

7. Apparatus according to claim 5 in which the data pulses are added to or subtracted from the scan pulses through means to prevent coincidence of a data pulse and a scan pulse.

8. Apparatus according to claim 5 including means which can detect the timing difference between the waveform of the composite output and the reference signal and which can limit the rate of addition or subtraction of data pulses so that it cannot exceed a predecided value.

9. Apparatus according to claim 5 in which one data pulse corresponds to a relative movement between the two relatively movable members of 0.0001 inch.

10. Apparatus according to claim 1 in which the photocell array comprises at least 20 photocells.

11. Apparatus according to claim 1 including means for attaching said apparatus to a machine tool.

12. Apparatus according to claim 1 and having a reflective optical grating a attached to one member and a light source, a photocell array and a transmitting optical grating attached to the other member, the light being arranged to illuminate the two gratings and the photocell array.

13. Apparatus according to claim 1 in which the photocell array comprises at least 32 photocells.

* * * * *